(12) United States Patent
Thompson et al.

(10) Patent No.: US 6,243,179 B1
(45) Date of Patent: Jun. 5, 2001

(54) BANDED ADD DROP DEVICE

(75) Inventors: William A. Thompson, Redbank; Martin Zirngibl, Middletown, both of NJ (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 08/961,603

(22) Filed: Oct. 31, 1997

(51) Int. Cl.[7] ...................................................... H04J 14/02
(52) U.S. Cl. .......................... 359/130; 359/124; 359/127; 359/128
(58) Field of Search .................................. 359/124, 127, 359/130, 128

(56) References Cited

U.S. PATENT DOCUMENTS

| | | | |
|---|---|---|---|
| 5,467,212 | * 11/1995 | Huber | 359/168 |
| 5,557,442 | * 9/1996 | Huber | 359/179 |
| 5,692,076 | * 11/1997 | Delisle et al. | 385/15 |
| 5,748,350 | * 5/1998 | Pan et al. | 359/130 |
| 5,764,821 | * 6/1998 | Glance | 385/14 |
| 5,801,858 | * 9/1998 | Roberts et al. | 359/114 |
| 5,926,300 | * 7/1999 | Miyakawa et al. | 359/124 |
| 5,982,518 | * 6/1998 | Mizrahi | 359/130 |
| 6,084,694 | * 7/2000 | Milton et al. | 359/124 |

* cited by examiner

Primary Examiner—Leslie Pascal
Assistant Examiner—Hanh Phan
(74) Attorney, Agent, or Firm—Gibbons, Del Deo, Dolan, Griffinger & Vecchione

(57) ABSTRACT

A demultiplexer demultiplexes an incoming WDM signal that contains a given number of channels into a given number of bands, each band containing a subset of the number of channels. An add/drop filter capable of handling the subset of channels in each band is coupled to the demultiplexer when a channel within a band requires further processing. A multiplexer multiplexes the processed bands and the passed through bands and outputs a WDM signal into the optical network.

9 Claims, 3 Drawing Sheets

BANDED ADD DROP DEVICE

FIELD OF THE INVENTION

This invention relates to the field of communications and in particular, to optical communications systems.

BACKGROUND OF THE INVENTION

Information communication efficiency over an optical fiber transmission system, such as the Synchronous Optical Network ("SONET"), may be increased by optical wavelength division multiplexing. Wavelength division multiplexing ("WDM") systems employ WDM signals consisting of a number of different wavelength optical signals, known as carrier signals or channels, to transmit information over optical fiber. Each carrier signal is modulated by one or more information signals. As a result, a significant number of information signals may be transmitted over a single optical fiber using WDM signals. Channels within a WDM signal may be distinguished by either their optical wavelength or optical frequency, and the terms wavelength and frequency will be interchangeably referred to for this purpose.

Optical switching, multiplexing and demultiplexing, as well as the ability to add or drop signals at a specific wavelength, are critical components of a WDM optical network. In particular, optical add/drop filters are employed to facilitate the addition and subtraction of specific channels to or from the WDM signal at different locations on the network. Prior art add/drop filters generally consist of a 1×N demultiplexer followed by a N×1 multiplexer, where N corresponds to the number of channels in the WDM signal. After the first element demultiplexes the wavelength components of the WDM signal, the output ports of the channels to be dropped are connected to a drop line fiber. The remaining channels are then remultiplexed and may include the addition of a new channel that has the same wavelength of the dropped component but with a different information signal.

A drawback of these prior art devices is that each channel has to be processed or routed independently without any consideration as to whether any of the channels have the same destination. As a consequence, unwanted signal degradation is introduced into each channel by the narrow band filtering required for channel-by-channel processing, even if the channel is simply passing through the add/drop filter. Moreover, the complexity and cost of the add/drop filter is increased since channel-by-channel processing requires that each channel must have the identical hardware even if it is unused. A further drawback of these prior art devices is that they are not easily expandable to accommodate more channels. These latter two disadvantages become increasingly more important as WDM networks use a greater number of channels to increase the capability and capacity of the optical communications networks.

SUMMARY OF THE INVENTION

The present invention is a device and method that mitigates the effects of per channel routing by grouping the channels into a number of bands and routing on a per band level when per channel routing is not required for the channels comprising the band. This band level of hierarchy in the wavelength plane establishes a two tier architecture where the required number of narrowband add/drop filters is decreased by the number of bands that are entirely dropped or passed through the device. Importantly, the present invention reduces the complexity and decreases the cost of the hardware.

In an exemplary embodiment of the present device, a demultiplexer demultiplexes an incoming WDM signal that contains a given number of channels into a given number of bands, each band containing a subset of the number of channels. An add/drop filter capable of handling the subset of channels in each band is coupled to the demultiplexer when a channel within a band requires filter processing. A multiplexer multiplexes the add/drop filter processed bands and the passed through bands and outputs a WDM signal into the optical network.

Advantageously, the modular structure of the present invention permits modification of specific components in the device to accommodate changes in the network without effecting the remaining components. The above factors make the present invention a versatile and efficient device for handling the increasing, number of channels being used in WDM based optical communications networks.

BRIEF DESCRIPTION OF THE DRAWINGS

A more complete understanding of the present invention may be obtained from consideration of the following description in conjunction with the drawings in which:

FIG. 5 is the exemplary embodiment of FIG. 3 with bands 2, 3 and 4 being passed through;

DETAILED DESCRIPTION

In general, the present invention mitigates the effects of per channel routing by grouping the channels into a number of bands and routing on a per band level when per channel routing is not required for the channels comprising the band. An optical demultiplexer demultiplexes an incoming WDM signal that contains a given number of channels into a given number of bands, each band containing a non-overlapping subset of the number of channels. An optical add/drop filter capable of handling the subset number of channels in each band is coupled to an output of the demultiplexer when a channel within a band requires further processing. An optical multiplexer multiplexes the passed through bands with the output from the optical add/drop filter and outputs a WDM signal into the optical communications network. The architecture permits modification and addition to the device without effecting the existing components.

Figure 1:
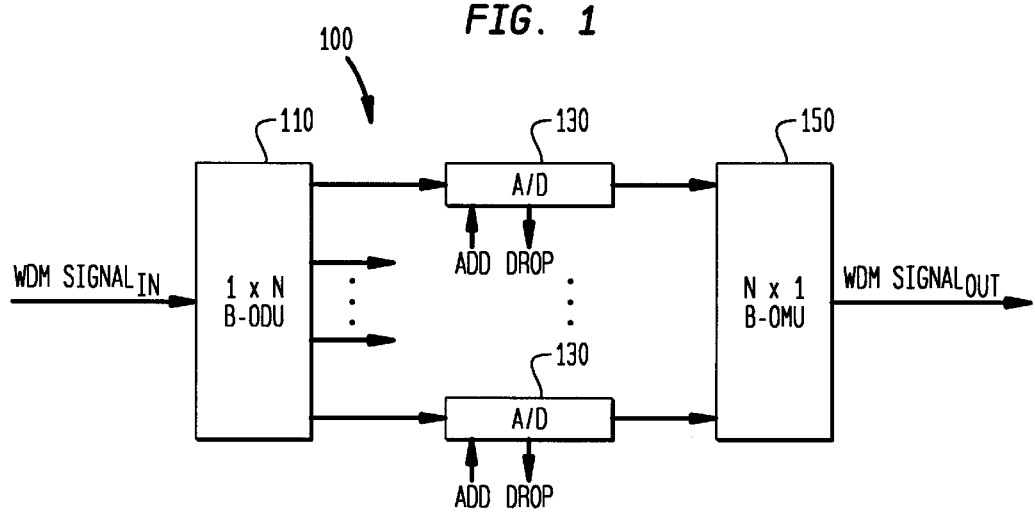
FIG. 1 is a schematic view of a banded add/drop device in accordance with the present invention.

FIG. 1 illustrates a schematic view of a banded add/drop device 100 in accordance with the present invention. The input to banded add/drop device 100 is a WDM signal received from an optical communications network (not shown). The WDM signal contains X total channels over which information is transmitted, where each channel represents a different wavelength or frequency. As such, the X channels represent the entire spectrum of the WDM based optical communications network. Banded add/drop device 100 includes a banded 1×N optical demultiplexer unit 110, a channel add/drop device 130, and a banded N×1 optical multiplexer unit 150, where N represents the number of bands. As explained below, the number of channel add/drop devices 130 corresponds to the number of bands that require a finer level of demultiplexing for add/drop purposes. For purposes of clarity, means for connecting the elements are not detailed as they would be well understood to one skilled in the art.

Operationally, demultiplexer 110 receives an input WDM signal from an optical communications network and demultiplexes the input spectrum into N bands, where each band contains a subset of the channels. In a preferred embodiment, each of the subsets consists of a equal number of non-overlapping continuous channels. For example, if the number of channels, X, equals 32, then the number of bands, N, can be set to 4. This results in each band containing 8 channels. Alternatively, if the spectrum has wavelengths $\lambda_1$–$\lambda_{32}$, then the bands are $\lambda_1$–$\lambda_8$, $\lambda_9$–$\lambda_{16}$, $\lambda_{17}$–$\lambda_{24}$, and $\lambda_{25}$–$\lambda_{32}$. The output port corresponding to each band of demultiplexer 110 is then coupled to the input port of the corresponding channel add/drop device 130 if a channel within the band requires further processing. As would be understood by one skilled in the art, channel add/drop device 130 is operable to drop and add the channels comprising the specific band. In sum, if one of the channels constituting the band has to be dropped and if a new channel has to be added, then the output port of the band has to be coupled with the associated channel level add/drop device. As a consequence of the present invention architecture, the number of channel add/drop devices is limited to the number of bands that require channel-by-channel routing. That is, when particular bands are not present, are entirely dropped or are passed through add/drop device 100, then channel add/drop devices are not needed for these bands. Specifically, when all of the channels within a particular band have the same destination, then channel level, narrowband filtering is not required. This reduces the complexity and cost of the add/drop device.

Figure 2:
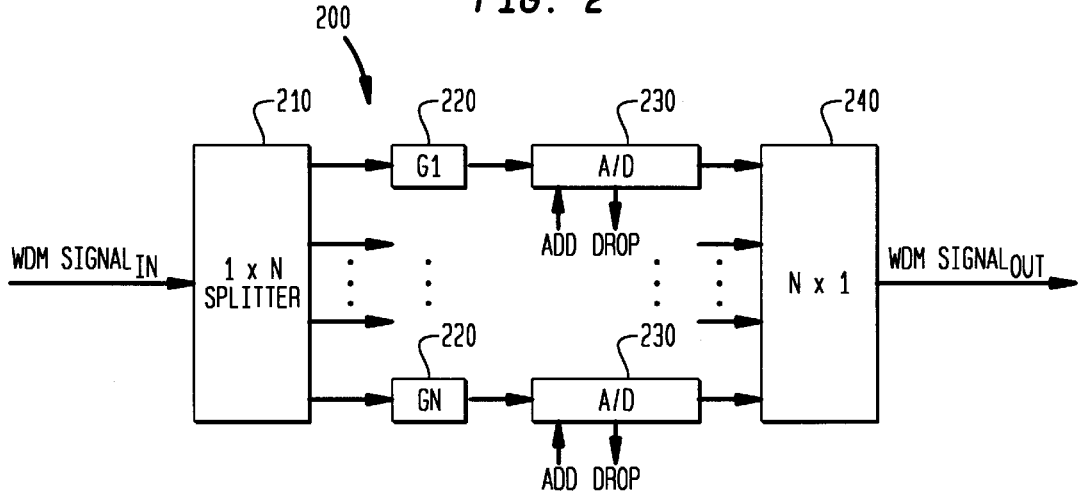
FIG. 2 is an exemplary embodiment of a banded add/drop device in accordance with the present invention.

Once the additional processing is completed by channel add/drop device 130, the output port is connected to an input port of multiplexer 150. If none of the channels that constitute a specific band requires further processing or the band has not been dropped, then multiplexer 150 multiplexes the remaining bands and forwards an output WDM signal into the optical communications network FIG. 2 illustrates an exemplary embodiment of an add/drop device 200 in accordance with the present invention. Add/drop device 200 includes a 1×N splitter 210 coupled to N transmissive gratings 220, where N represents the number of bands. Transmissive gratings 220 passes the desired band and reflects the remaining bands. As explained above, a channel add/drop device 230 may be coupled to a corresponding transmissive grating 220 if channel level processing is required within a specific band. Once channel add/drop device 230 processes the channels, the output is coupled to a N×1 multiplexer 240. The outputs of transmissive gratings 220 that are not coupled to channel add/drop device 230 are coupled to N×1 multiplexer 240 if they are not being dropped.

Figure 3:
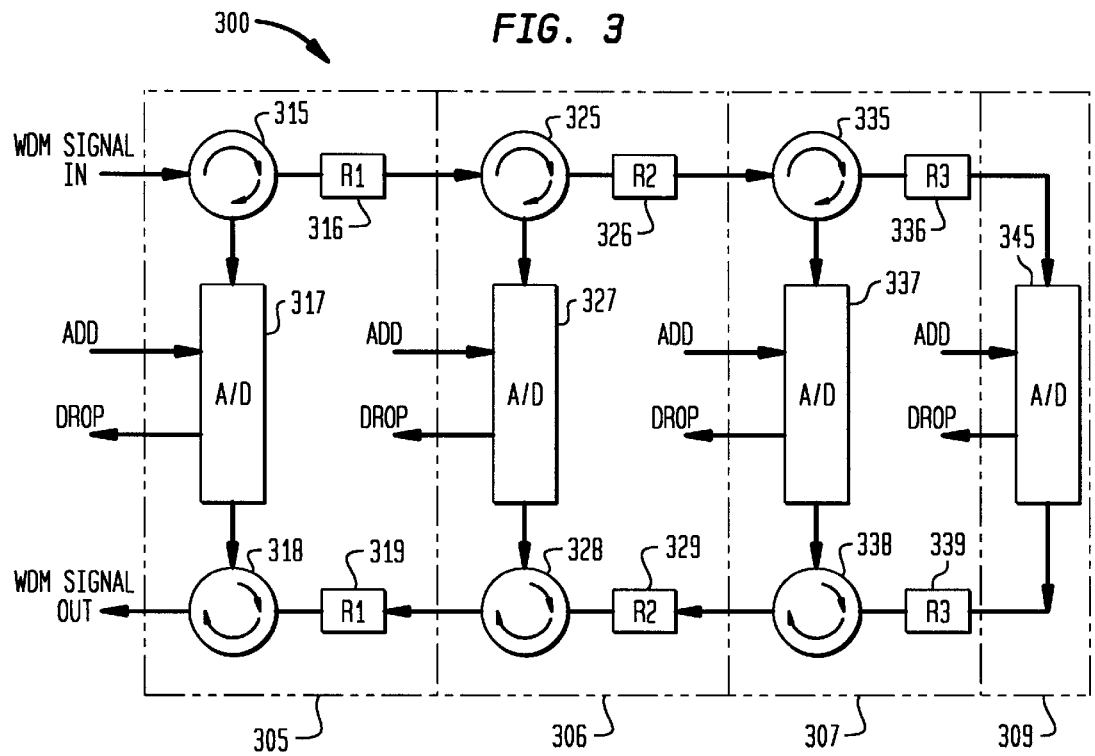
FIG. 3 is another exemplary embodiment of a banded add/drop device that handles four bands in accordance with the present invention.

Referring now to FIG. 3, there is illustrated a add/drop device 300 that is equipped to process four bands. Add/drop device 300 uses circulators with reflective gratings to separate the input spectrum into the desired bands. As would be understood by one skilled in the art, circulators direct optical signals depending upon the point of entry. As such, the arrows shown in the circulator components refer to the signal path. Moreover, since circulators are intrinsically loss-free, this embodiment minimizes signal insertion loss. Furthermore, reflective gratings are used in this embodiment as contrasted with the transmissive gratings of the previous embodiment Reflective gratings reflect the desired band and pass through the remaining bands.

As illustrated in FIG. 3, add/drop device 300 includes three band filter blocks 305, 306, 307 and a band filter block end 309 that are coupled together to process the desired number of bands. Band filter block 305 includes a circulator 315 that is coupled to a reflective grating 316 and is further coupled to an input of a channel add/drop device 317. As would be understood by one skilled in the art, channel add/drop device 317 is operable to drop and add the channels comprising the specific band. An output port of channel add/drop device 317 is coupled to circulator 318, which is further coupled to a reflective grating 319. Band filter blocks 306 and 307 are similarly constructed. Since band filter block end 309 processes the last band, it includes simply a channel add/drop device 345.

Operationally, an input WDM signal is received by circulator 315 and passed through to reflective grating 316. Reflective grating 316 reflects the wavelengths or channels corresponding to the first band and passes through the remaining spectrum. The reflected channels are received by circulator 315 which directs the reflected channels into channel add/drop device 317. After the necessary add/drop processing is completed, the output of channel add/drop device 317 is forwarded to circulator 318, which in turn directs the band 1 spectrum towards reflective grating 319. Reflective grating 319 reflects the band 1 spectrum back towards circulator 318. Band filter blocks 306 and 307 operate in a similar manner. Again, since band 4 is the last band processed in add/drop device 300, reflective gratings and circulators are not required and the band 4 spectrum is forwarded to channel add/drop device 345. As illustrated in FIG. 3, circulators 338, 328 and 318 and reflective gratings 339, 329 and 319 each direct their corresponding bands towards circulator 318, which then forwards an output WDM signal into the optical communications network. As such, the input side circulators and reflective gratings demultiplex the input WDM signal and the direct the bands requiring further processing into the channel add/drop device. The output side circulators and reflective gratings multiplex the passed through bands and the processed bands and forward an output WDM signal into the optical communications system. It is understood that any of the add/drop devices can be bypassed by a simple fiber jumper directly connecting circulator 315, for example, to circulator 318 in block 305, if all the channels in that particular band are passed. Similarly, if all the channels are dropped, there is no need for the add/drop device. The same applies to blocks 306, 307 and 309.

Figure 4:
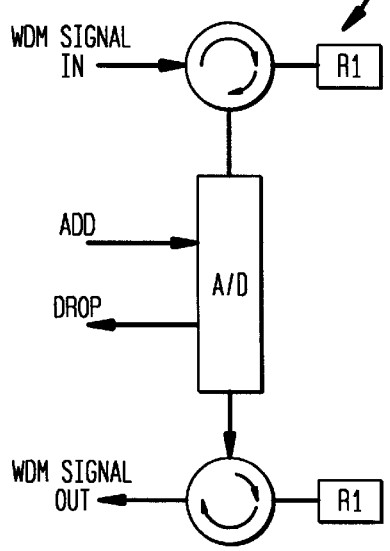
FIG. 4 is the exemplary embodiment of FIG. 3 with bands 2, 3 and 4 not used.
Figure 5:
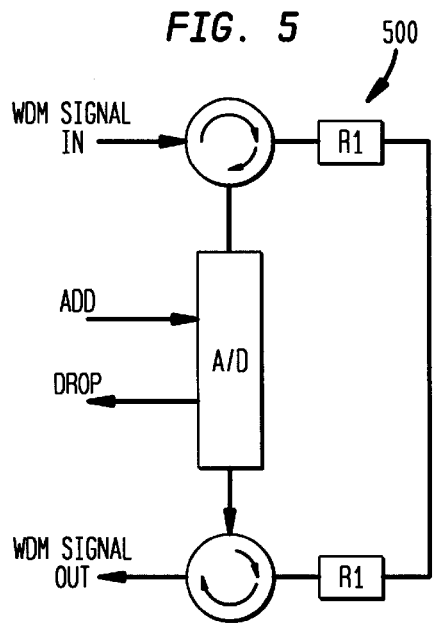

As shown above, add/drop device 300 is modular in design in that a set of band filter blocks are coupled together to process the desired number of bands. In this way, add/drop device 300 can easily and efficiently accommodate any changes in the optical communications network by removing circulators and reflective gratings for bands that are not present (as illustrated in FIG. 4 by add/drop device 400), entirely passed (as illustrated in FIG. 5 by add/drop device 500), or entirely dropped (as illustrated in FIG. 4 by add/drop device 400). Moreover, the upgrading of add/drop device 300 to accommodate more bands and channels is accomplished just as easily and will not result in service interruption or the already present bands. As such, although a four band embodiment is illustrated in FIGS. 3–6, the present invention architecture is easily adaptable for a greater number of bands and channels.

Figure 6:
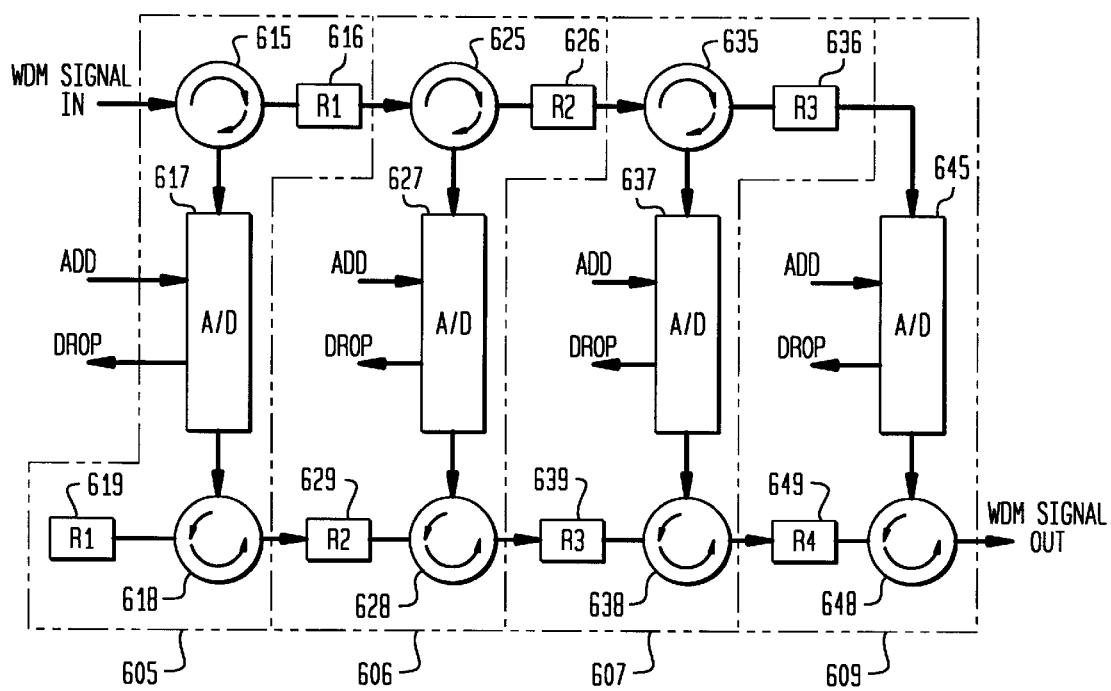
FIG. 6 is another exemplary embodiment of a banded add/drop device that handles four bands in accordance with the present invention.

Referring now to FIG. 6, there is illustrated an add/drop device 600 that equalizes the losses experienced by each band. Specifically, add/drop device 600 includes three band filter blocks 605, 606, 607 and a band filter block end 609 that are coupled together to process the desired number of bands. Band filter block 605 includes a circulator 615 that is coupled to a reflective grating 616 and is further coupled to an input of a channel add/drop device 617. As would be understood by one skilled in the art, channel add/drop device 617 is operable to drop and add the channels comprising the specific band. An output port of channel add/drop device 617 is coupled to circulator 618, which is further coupled to a reflective grating 619. Band filter blocks 606 and 607 are similarly constructed. Since band filter block end 609 processes the last band, reflective grating 636 is coupled to an input of a channel add/drop device 645. An output port of channel add/drop device 645 is coupled to a circulator 647, which is further coupled to a reflective grating 609.

Operationally, an input WDM signal is received by circulator 615 and passed through to reflective grating 616. Reflective grating 616 reflects the wavelengths or channels corresponding to the first band and passes through the remaining spectrum. The reflected channels are received by circulator 615 which directs the reflected channels into channel add/drop device 617. After the necessary add/drop processing is completed, the output of channel add/drop device 617 is forwarded to circulator 618, which in turn directs the band 1 spectrum towards reflective grating 619. Reflective grating 619 reflects the band 1 spectrum back towards circulator 618, and through reflective grating 629, circulator 628, reflective grating 639, circulator 638, reflective grating 649, and circulator 648. Band filter blocks 606 and 607 operate in a similar manner. Since band 4 is the last band processed in add/drop device 600, the band 4 spectrum is forwarded directly to channel add/drop device 645. After processing, band 4 is treated as above. As shown in FIG. 6, each of the bands are directed toward circulator 648, which then forwards an output WDM signal into the optical communications network. As such, each band passes through three different reflective gratings. For example, band 1 passes through reflective gratings 629, 639 and 649 and band 3 passes through reflective gratings 616, 626 and 649. As a result, each band experiences nearly identical losses due to the reflective gratings. As explained above, a fiber jumper can be connected between specific circulators if a band is to be passed through and the add/drop device can be eliminated if the band is to be dropped.

Figure 7:
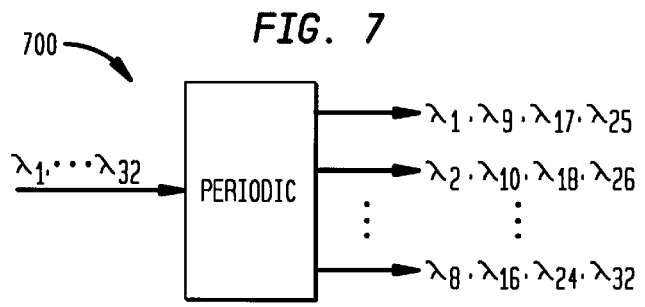
FIG. 7 is an exemplary embodiment of a single code optical demultiplexer/multiplexer device in accordance with the present invention.

Referring to FIG. 7, there is shown an optical demultiplexer/multiplexer device 700 that are used in, for example, add/drop devices 317, 327, 337 and 345 or add/drop devices 617, 627, 637 and 645. Device 700 is a single code optical demultiplexer/multiplexer device where the periodicity of the device is selected to match the designated banded structure. For example, if there were a total of 32 channels, then assuming equal channel distribution, there would be 4 bands with eight channels a piece. As shown in FIG. 7, the periodicity of the device would then be set to 8, to account for the 4 bands and the 32 total channels. This implementation of the present invention further illustrates the modularity of the full add/drop device since the periodicity of device 700 can be adjusted to reflect added bands and channels.

A device and method for efficiently handling multiple channels with decreased complexity and reduced costs has thus been presented. A two tier architecture has been illustrated which mitigates the effects of per channel routing by grouping the channels into a number of bands and routing on a per band level when per channel routing is not required for the channels comprising the band. This band level of hierarchy in the wavelength plane uses a coarse level of demultiplexing to handle bands (and the channels contained therein) that are not present, entirely dropped or passed through the device. A fine level of multiplexing is used on a band when a channel contained therein has to be dropped and/or added. This reduces the complexity of the device and decreases the cost of the hardware. Moreover, the modular structure of the present invention provides adaptability to accommodate changes in the network without effecting existing service.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. An add/drop device for handling wavelength division multiplexed ("WDM") signals having multiple channels, comprising:
   a demultiplexer for demultiplexing the WDM signal into a given number of bands, each of said given number of bands containing a subset of the multiple channels;
   an add/drop filter for processing each of said given number of bands when a channel within each of said given number of bands requires channel level processing; and
   a multiplexer for multiplexing bands received from said demultiplexer and said add/drop filter, wherein:
   said demultiplexer includes at least one circulator coupled to at least one reflective grating; and
   said multiplexer includes a corresponding circulator coupled to a corresponding reflective grating.

2. The device according to claim 1, wherein said band filter block is connectable with at least another band filter block to process at least another of said given number of bands when said processing is required.

3. The device according to claim 1, wherein said at least one reflective grating is coupled to said corresponding reflective grating to pass said given number of bands not requiring processing.

4. The device according to claim 1, wherein said at least one reflective grating and said corresponding reflective grating are uncoupled at one end to drop at least one band from said given number of bands.

5. The device according to claim 1, wherein circulators and reflective gratings of said demultiplexer and multiplexer are arranged such that each of said given number of bands is reflected by at least one of said reflective gratings to follow along a path that passes through a substantially equal number of reflective gratings between said demultiplexing of said signal into said band and said multiplexing of said band to form a multiplexed output of said multiplexer.

6. An optical communications network for carrying wavelength division multiplexed ("WDM") signals having multiple channels, comprising:
   an optical demultiplexer for demultiplexing the WDM signal into a given number of bands, each of said given number of bands containing a subset of the multiple channels;

an add/drop filter for processing each of said given number of bands when a channel within each of said given number of bands requires said processing; and an optical multiplexer for multiplexing bands received from said optical demultiplexer and said add/drop filter, wherein:

said optical demultiplexer includes at least one circulator coupled to at least one reflective grating; and said optical multiplexer includes a corresponding circulator coupled to a corresponding reflective grating.

7. The system according to claim 6, wherein said band filter block is connectable with at least another band filter block to process at least another of said given number of bands when said processing is required.

8. The system according to claim 6, wherein said at least one reflective grating is coupled to said corresponding reflective grating to pass said given number of bands not requiring processing.

9. The system according to claim 6, wherein said at least one reflective grating and said corresponding reflective grating are uncoupled at one end to drop at least one band from said given number of bands.

* * * * *